(12) United States Patent
Wilkinson

(10) Patent No.: US 6,243,496 B1
(45) Date of Patent: Jun. 5, 2001

(54) DATA COMPRESSION

(75) Inventor: James Hedley Wilkinson, Heathlands (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 08/141,610

(22) Filed: Oct. 27, 1993

(30) Foreign Application Priority Data

Jan. 7, 1993 (GB) ................................................ 9300223

(51) Int. Cl.$^7$ ...................................................... G06T 9/00
(52) U.S. Cl. ............................................. 382/245; 382/246
(58) Field of Search .................................. 382/56, 49, 50, 382/232, 233, 245, 246; 358/261.1, 427, 261.4

(56) References Cited

U.S. PATENT DOCUMENTS

| | | | |
|---|---|---|---|
| 4,939,583 | * 7/1990 | Tsuboi et al. .................... | 358/261.1 |
| 5,056,154 | 10/1991 | Aono et al. ...................... | 382/246 |
| 5,121,197 | 6/1992 | Yamada et al. .................. | 358/535 |
| 5,241,490 | * 8/1993 | Poon .................................. | 708/205 |
| 5,341,440 | * 8/1994 | Earl et al. ......................... | 382/233 |
| 5,353,026 | * 10/1994 | Wilson .............................. | 341/143 |

FOREIGN PATENT DOCUMENTS 0 327 931   8/1989 (EP) .

* cited by examiner

*Primary Examiner*—Jon Chang
(74) *Attorney, Agent, or Firm*—Frommer Lawrence & Haug, LLP.; William S. Frommer

(57) ABSTRACT

For compressing M-bit data words where M is a plural positive integer, groups of N data words are defined, where N is a plural positive integer, and then the bits of the group of N data words are output as a bit stream including a sequence of sub-streams, each sub-stream relating to a respective bit position in the N data words and being formed from a sequence of N data bits from that bit position of respective data words. The bit sequences are run length encoded and the run length codes thus generated are further encoded using a commaless code such as a Huffman code.

44 Claims, 11 Drawing Sheets

| 0 | 2 | 7 | 16 | 28 | 38 | 46 | 55 |
|---|---|---|---|---|---|---|---|
| 1 | 4 | 10 | 18 | 29 | 39 | 48 | 56 |
| 3 | 6 | 11 | 20 | 31 | 40 | 49 | 57 |
| 5 | 8 | 14 | 23 | 33 | 42 | 50 | 59 |
| 9 | 12 | 17 | 25 | 35 | 43 | 52 | 60 |
| 13 | 15 | 22 | 30 | 37 | 45 | 53 | 61 |
| 19 | 21 | 26 | 34 | 41 | 47 | 54 | 62 |
| 24 | 27 | 32 | 36 | 44 | 51 | 58 | 63 |

*FIG. 8*

| 65 | 63 | 83 | 125 | 206 | 357 | 637 | 1166 |
|---|---|---|---|---|---|---|---|
| 61 | 67 | 88 | 133 | 217 | 373 | 663 | 1208 |
| 64 | 73 | 97 | 145 | 235 | 399 | 705 | 1276 |
| 73 | 84 | 111 | 163 | 261 | 438 | 766 | 1375 |
| 87 | 100 | 130 | 189 | 297 | 492 | 850 | 1511 |
| 107 | 122 | 157 | 224 | 346 | 565 | 961 | 1690 |
| 135 | 152 | 193 | 271 | 411 | 660 | 1108 | 1932 |
| 173 | 194 | 243 | 335 | 498 | 768 | 1298 | 2223 |

*FIG. 9*

DATA COMPRESSION

BACKGROUND OF THE INVENTION

1. Field of the Invention

This invention relates to data compression. The invention relates particularly, but not exclusively, to the field of image data compression.

2. Description of the Prior Art

It has been proposed to provide an image data processing system in which image data are decorrelated into sub-band components, quantised and then entropy encoded. The quantisation provides some degree of data compression with some loss of information content. The subsequent entropy encoding effects a further degree of data compression with no loss of information content.

One known entropy encoding technique is so called run length encoding. A typical run length encoder looks for sequences of successive zeros within a data stream and assigns a code word to substitute for each sequence of zeros within the data stream. When the data stream is subsequently read, the run-length codes can be expanded to recreate the original data stream.

A variation on this arrangement is the type of run length encoding proposed in the standard being devised by the Joint Photographic Experts Group (JPEG) and currently under review by the International Standards Organisation. The JPEG standard proposes a run-length encoding technique in which a sequence of successive zero values terminated by a non-zero value is treated as an "event" and assigned a two-word run length code. The syntax of these two-word codes is: [RUNLENGTH, SIZE], [AMPLITUDE]. The RUNLENGTH variable specifies the number of zero values preceding the non-zero value. The SIZE variable specifies the number of bits that will be required to represent the amplitude of the non-zero value that terminates the sequence of successive zero values. The AMPLITUDE variable specifies the amplitude of the non-zero value.

Once the image data has been subjected to this run length encoding, it is then subjected to Huffman encoding. Huffman encoding is a form of commaless encoding whereby events are mapped to a set of codes having the property that no valid code is a prefix of a longer code. The most common events are mapped to the shortest Huffman codes.

An alternative encoding technique for the encoding of image signals has been proposed by P. Delogne and B. Macq in an article entitled "Universal Variable Length Coding for an Integrated Approach to Image Coding", published in Ann. Telecommun 46 7-8/1991). The authors describe a so-called "skip coding" technique for entropy encoding.

The skip coding technique will be described herein with reference to FIG. 1 which represents a sequence of image sample code words as a two-dimensional array represented in FIG. 1 of the accompanying drawings. In the two-dimensional array, the horizontal direction represents successive words for respective image samples, and the vertical axis represents the bits of each word from the least significant bit (LSB) position at the bottom (i.e. bit 0) to the most significant bit position (MSB) at the top (i.e. bit 11). In FIG. 1, the sample words for respective image pixels are represented as a one-dimensional stream. If, alternatively, they were represented two-dimensionally in terms of the rows and columns of a raster scanned image, the resulting array corresponding to FIG. 1 would be three dimensional, with the rows and columns forming two dimensions and the respective bits of each code word forming the third dimension. In FIG. 1, the cross-hatched bit positions represent non-zero bits and the blank bit positions represent zero bits. Words 0, 2, 3, 6, 7, 9, 10, 14, 15, 18, 20, 21 and 23 are assumed to represent words having only zero bits.

In accordance with the skip coding technique described in the aforementioned article, the array of sample words is then scanned as a sequence of bit runs from the most significant bit (MSB) position to the least significant bit position (LSB). However, the scanning does not access all bit positions in order. The scanning starts, for example at the top left hand position as illustrated in FIG. 1 (i.e. the left-hand side of the MSB position—bit 11 of word 0), and continues along the horizontal arrows A1.1, A1.2 until a non-zero bit is reached in a word, or until a predetermined maximum number m of zeros have been counted. At this point either a run length code for the number of zeros terminated by a one or for the run of m zeros is encoded. If a most significant non-zero bit in a word is encountered (eg. the bit 10 of word 8) the bits of this word are then output uncoded as represented by the vertical arrow A2 and word 8 is eliminated from the array. After the output of a word, or if a run of m zeros has been encoded, the scan restarts at the next bit in the scanning order (e.g. in FIG. 1 at bit 10 of word 9) and continues along the horizontal arrows A3.1, A3.2, A3.3 until a most significant non-zero bit in a further word is reached (in FIG. 1, bit 8 of word 19). Note in FIG. 1 that bit 8 of word 8 is skipped (hence the term applied to this type of coding) as by then that word has already been output and eliminated from the array. The bits of word 19 are then output uncoded as represented by the vertical arrow A4, the word 19 is eliminated from the array and the scanning restarts at the next bit position in the scanning order (in FIG. 1, bit 8 of word 20—horizontal arrow A5.1). This process continues until the last bit in the block (bit 0 of word 23) is reached.

The coding process proposed in this article does provide for relatively efficient coding of data samples. However, it does have a number of disadvantages. As the compression encoding employs bit-based encoding, it must operate at a faster rate than word-based encoders. Accordingly, a hardware implementation is more suited to meeting the high processing frequency requirements. However, as the coding method requires the coding process to switch repeatedly between run length encoding and the output of the bits of a word in uncoded form, this complicates the hardware implementation of the technique. Also, where data (e.g. image data) are to be stored or transmitted in a manner which provides a shuttle mode, a marker flag must be set against a word position when a most significant non-zero bit in a word is met and the remaining lower bits appended thereto in order for the skipping process to work. In the case of a digital video tape recorder, for example, where the data for recording are formatted in recording blocks, the coding will inevitably be split across those recording blocks. Then, if a recording block preceding a desired recording block is not retrieved on replay, it may be impossible to know where the marker flags have been set with the result that the replay decoder will not be able to restore the recorded data.

SUMMARY OF THE INVENTION

It is a constant aim in the field of data compression to increase the degree of compression achieved without adversely affecting the identity of the data subsequently regenerated.

Accordingly, in accordance with a first aspect of the invention, there is provided a data compression system for compressing M-bit data words where M is a plural positive integer, the data compression system comprising:

a) bit stream generating means for generating a set of bit streams in which successive bits are from a corresponding bit position of respective M-bit data words, the bit stream generating means comprises group defining means for defining a group of N data words, where N is a plural positive integer, and sequencing means for outputting the bits of the group of N data words as a set of bit streams, each bit stream relating to a respective bit position in the N data words and comprising a sequence of N data bits from that bit position of respective data words; and b) run length encoding means connected to receive the output of the sequencing means to run length encode the set of bit streams.

The outputting of the bit streams for a group of data words in accordance with the invention, with subsequent run length encoding provides for effective and efficient compression in a manner which is capable of straightforward implementation. It is not necessary to continually switch between a first mode in which bits are run length encoded and a second mode in which the bits of a word are output uncoded.

By providing the sequencing means with means for identifying the bit position of the most significant active bit in a group of data words, for generating a header for the group, which header includes the identity of the most significant active bit position, and for outputting only those bits at positions equal to or less significant than the most significant active bit position from the N data words, it is not necessary to output all the bits of the data words. This provides an increase in processing and coding efficiency.

Preferably, also, the sequencing means outputs bits for the N data words in the same order for each bit position output, for example in a raster scanning type manner. Alternatively, however, an alternative scanning strategy could be used, for example a zig-zag scanning strategy.

The group defining means preferably comprises memory means for storing a group of N data words and the sequencing means preferably comprises address generating means for addressing individual bits of data words stored in the memory for outputting the bit stream.

Preferably, in order to provide for continuous processing, the group defining means comprises a further memory means for storing a further group of N data words and the sequencing means comprises means for alternating between addressing a first of the memory means for outputting a bit stream for a previously stored group of data words while a subsequent group of data words is stored in the other of the memory means and addressing the other memory means for outputting a previously stored group of data words while a subsequent group of data words is stored in the first memory means.

The data words of a group can be treated separately. Alternatively, the sequencing means can be arranged to output a continuous bit stream where bit streams for subsequent groups of data words are concatenated one to another.

In a first embodiment, the sequencing means generates a serial bit stream with the bit streams for respective bit positions concatenated to one another. In this case the bit streams for respective bit positions are preferably output in order of decreasing bit significance.

Instead of generating a single bit stream, the bit stream generating means can comprise parallel sequencing means for outputting plural bit streams, each of which corresponds to at least one of the M bit positions in the data words and comprises a sequence of data bits from that bit position of respective data words, and the run length encoding means can comprise plural run length encoders, each of which is connected to receive and encode a respective one of the plural bit streams.

In one particular example M parallel sequencing means are provided, each outputting a bit stream corresponding to a respective one of the M bit positions in the data words. Where blocks of a fixed maximum size are to be generated, the sequencing means preferably comprises means for terminating the encoding of data words to avoid overflowing a compressed data block at a terminal data word and for generating a header indicative of a perfectly encoded bit position for that terminal data word.

Preferably, the run length encoding means encodes strings of zeros and strings of ones. This provides for efficient encoding. Accordingly, the run length encoding means preferably comprises string counter means for counting first strings of bits of a first value terminated by a bit of a second value, subject to a first maximum string length, and for counting second strings of the second value terminated by a bit of the first value, subject to a second maximum string length, in the bit stream, and string encoding means for encoding a bit string code for the first and second maximum string lengths and for each possible first string length and each possible second string length, whereby the run length encoding means outputs a series of bit string codes for successively detected bit streams.

The run length encoding means preferably includes a group counter means for accumulating the total number of bits in the bit stream for a group of data words output by the sequencing means and group terminator means responsive to the group counter means and to a string of bits from the sequencing means for which no specific encoding is defined when the last bit for a group of data words is output by the sequencing means to apply a predetermined run length code selected from those for the first and second maximum string lengths and the possible first and second string lengths.

Preferably commaless encoding means are connected to receive the output of the run length encoding means for applying a commaless encoding to the run length codes. The commaless encoding means is preferably implemented in the form of Huffman look-up tables in which possible run length code entries are grouped in accordance with the probability of occurrence. The grouping of the Huffman codes has a marginal effect on the coding efficiency, but results in compact Huffman encoding tables.

The efficiency of the compression encoding can be improved by providing preprocessing means for mapping input data values of the data words in accordance with a predetermined mapping whereby rapidly changing bits are located in the lower significant bit positions of the data words.

In accordance with a second aspect of the invention, there is provided a method for compressing M-bit data words where M is a plural positive integer, the data compression method comprising the steps of:

a) generating a set of bit streams in which successive bits are from a corresponding bit position of respective M-bit data words by
   a)(i) defining a group of N data words, where N is a plural positive integer and
   a)(ii) outputting the bits of the group of N data words as a set of bit streams in which each bit stream relates to a respective one of the bit positions in the N data words and comprises a sequence of N data bits from that bit position of respective data words; and b) run length encoding the bit streams, whereby the bits of the M-bit data words are encoded by run length encoding.

The invention also provides a data decompression system for decompressing data compressed by a system as defined above, the data decompression system comprising:

c) run length decoding means for generating bit streams from successive bit sequence codes; and d) data word regenerating means for generating data words from the bit streams in which the bits at corresponding bit positions of respective M-bit data words are defined by successive bits in the bit streams.

Preferably, the data decompression system comprises header decoding means for decoding compression information for use in decompressing the compressed data from a header associated with the compressed data for a group of data words.

The invention further provides a data decompression method for decompressing data compressed by a method defined above, the method comprising:

c) generating bit streams from successive bit sequence codes; and d) generating data words from the bit stream in which the bits at corresponding bit positions of respective M-bit data words are defined by successive bits in the bit streams.

BRIEF DESCRIPTION OF THE DRAWINGS

FIG. 8 illustrates the order of sub-band scanning of AC spatial frequency components;

FIG. 9 is an illustration of a quantisation matrix for use with a quantiser forming part of the system of FIG. 2 based on interlaced scanning;

DESCRIPTION OF THE PREFERRED EMBODIMENTS

Figure 2:
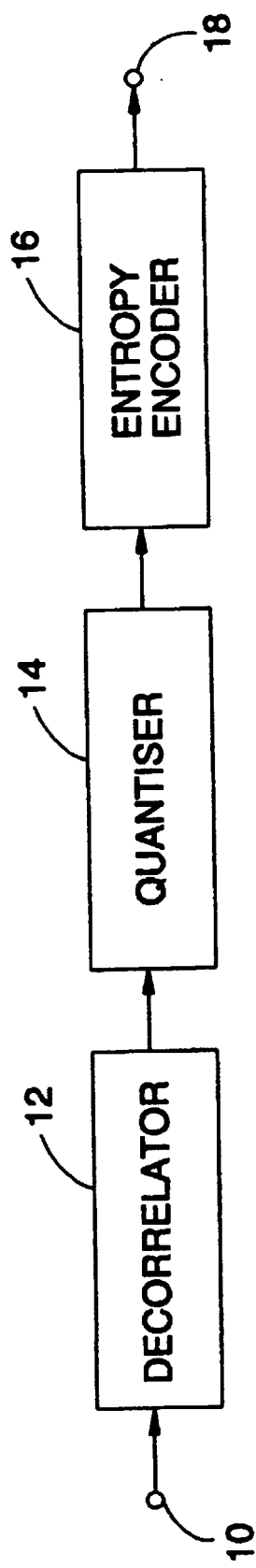
FIG. 2 is a schematic illustration of a data compression system.

FIG. 2 is a schematic block diagram giving an overview of a compression processing apparatus for effecting intra-image frequency separation and compression of a video signal in the two-dimensional spatial frequency domain. A video signal, which is in digital form and comprises successive multi-bit (for example 8-bit) samples or words each representing a respective pixel of a scanned image or picture, is applied via an input 10 to a decorrelator 12. A frequency separated video signal is fed by the decorrelator 12 via quantiser 14 to an entropy encoder 16 to produce a compressed signal at an output 18. The compressed signal can then be transmitted or stored, as required by the particular application.

Figure 3:
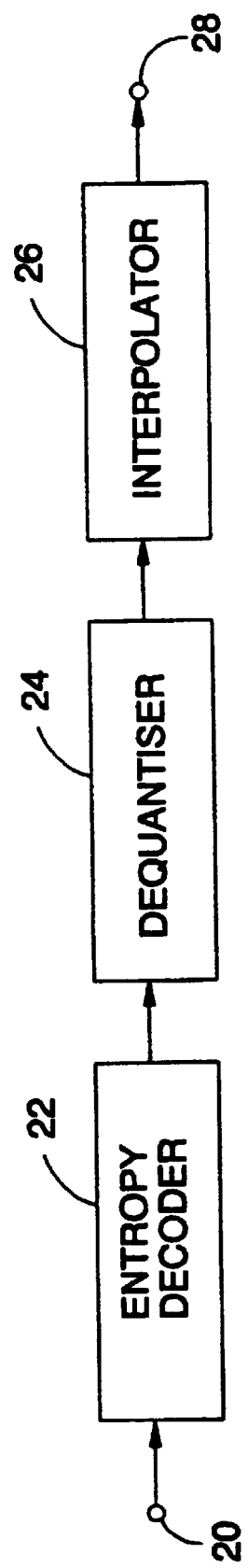
FIG. 3 is a schematic illustration of a complementary data decompression system.

FIG. 3 is a schematic block diagram giving an overview of a decompression processing apparatus for decompressing the compressed signal after transmission or storage. The compressed signal can be restored substantially to its original form by expansion by way of entropy decoding, dequantising and interpolation operations. The compressed signal is input at 20 to an entropy decoder 22 and is then passed via a dequantiser 24 to an interpolator 26, which outputs the restored video signal at 28. The steps of entropy decoding, dequantising and interpolation employ parameters converse to those used for decorrelation, quantising and entropy encoding, respectively, upon compression.

The structure and operation of the various elements of the compression processing apparatus of FIG. 2 will now be described in more detail.

The decorrelation operation performed by the decorrelator 12 relies on the fact that neighbouring pixels of an image are highly correlated, whereby processing an image (for example a field or frame of a video signal) to form frequency separated signal portions representing different components of the image in the two dimensional spatial frequency domain enables a reduction in the amount of information needed to represent the image. Specifically, the frequency separated signal portions represent different spatial frequency components of the image.

Various decorrelation techniques could be used for the decorrelator 12. One suitable form of decorrelation would be so called transform coding, in particular the discrete cosine transform. The use of discrete cosine transform for decorrelation is prescribed in a version of a compression system described in a standard proposed by the Joint Photographic Experts Group. According to the transform technique of decorrelation, the signal is subjected to a linear transform (decorrelation) operation prior to quantisation and encoding.

In the present example, however, an approach to decorrelation based on sub-band coding is used. Accordingly, the decorrelator 12 in the apparatus of FIG. 2 comprises a spatial (2-dimensional) sub-band filtering arrangement which divides the input video signal into a plurality of uncorrelated sub-bands each containing the spatial frequency of the content of the image in respect of one of a plurality of areas of a two-dimensional frequency plane of the image. Decorrelation is achieved by putting the energy of the overall image into different sub-bands of a two-dimensional spatial frequency domain. Sub-band filtering methods, such as sub-band coding, logarithmic sub-band coding and wavelet coding, are believed to provide better decorrelation than the transform approach.

Figure 4:
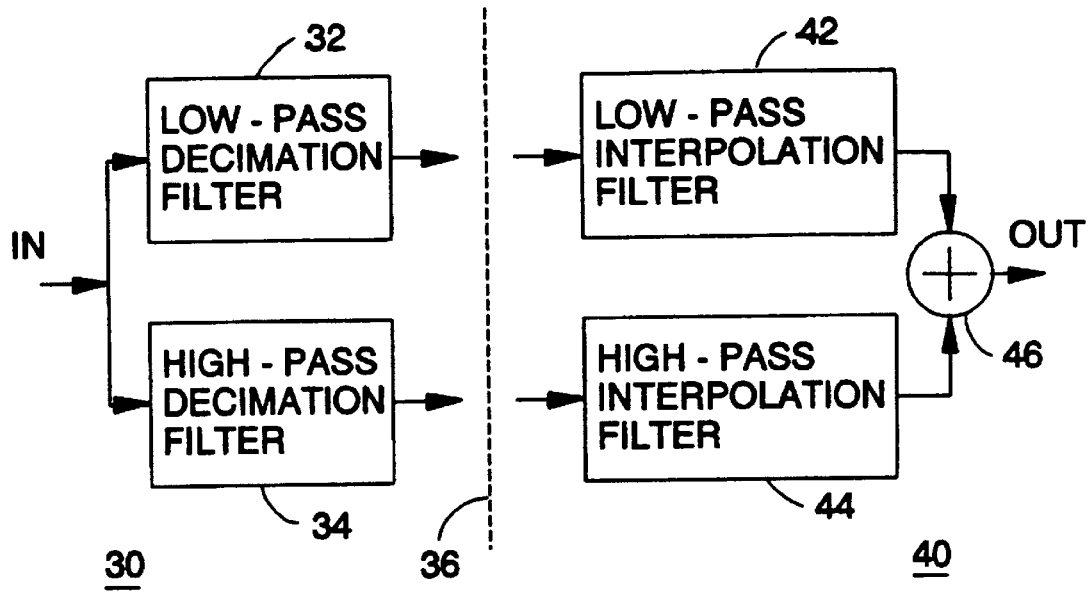
FIG. 4 is a schematic illustration of a simple sub-band coding system.

FIG. 4 illustrates the principle of sub-band coding in which an input video signal is passed at IN through a low-pass decimation filter 32 and a high-pass decimation filter 34 of a decorrelator 30. The resulting two output signals represent different portions of the frequency spectrum of the input signal. Each of the two output signals is at ½ the data rate of the data input at IN. The two signals can then be processed further for storage or transmission as indicated by the dashed line 36 in FIG. 4. When the sub-band components are recovered from storage or after transmission they are passed through corresponding matching filters in an interpolator 40 to regenerate the original frequency components. These matching filters are a low-pass interpolation filter 42 and a high-pass interpolation filter 44. The outputs of the interpolation filters 42, 44 are added by a summation circuit 46 to yield the original video input signal at OUT. The data received by each of the filters 42 and 44 is ½ of that output at OUT. FIG. 4 illustrates the decomposition of the input video signal into two sub-bands. In practice, the input video signal would be decomposed into many more sub-band components.

Figure 5:
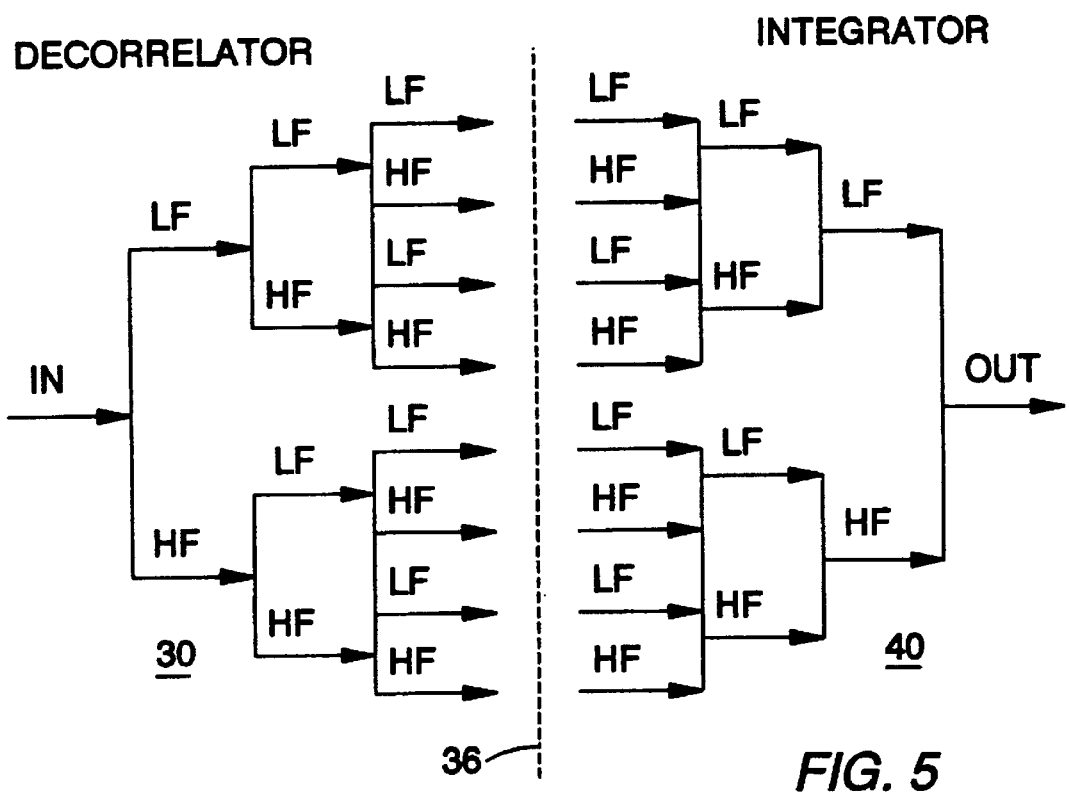
FIG. 5 is a schematic illustration of a higher order sub-band coding system.

FIG. 5 illustrates the decomposition of an input signal into eight sub-band components in a decorrelator 30 and its subsequent recombination into an output video signal in an interpolator 40. LF indicates a low-pass decimation or interpolation filter (as appropriate left or right, respectively, of the dashed line 36) and HF indicates a high-pass decimation or interpolation filter (as appropriate left or right, respectively, of the dashed line 36). The output of the data from each of the filters immediately to the left of the line 36 in FIG. 5 at ⅛th of the rate of the data input at IN. Likewise the data input to each of the filters immediately to the right of the line 36 in FIG. 5 is at ⅛th of the data rate of the data output at OUT.

Figure 6:
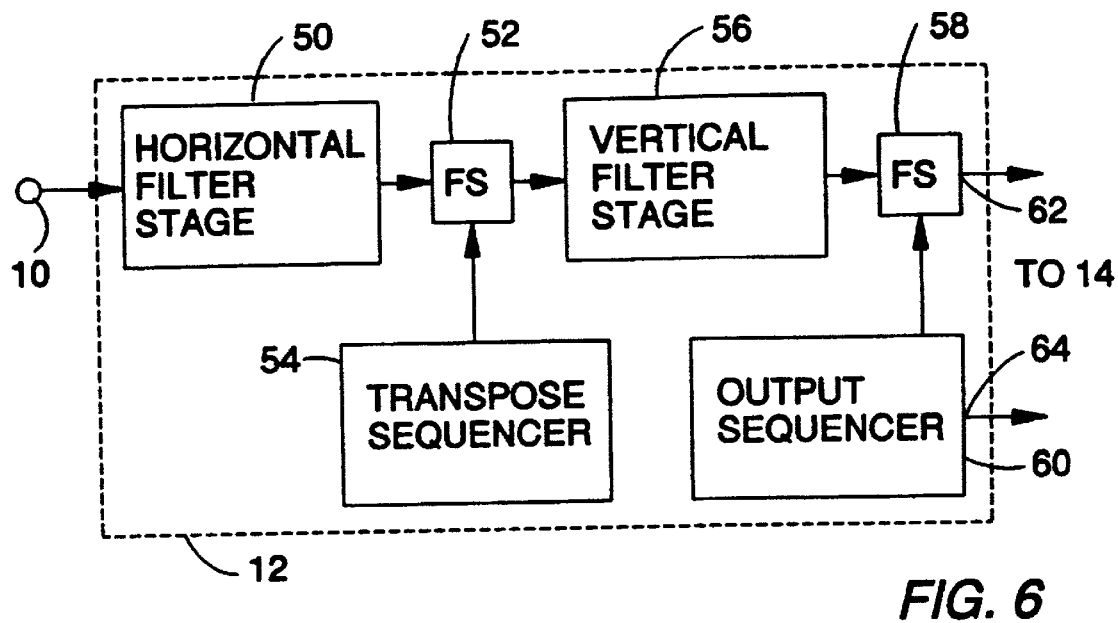
FIG. 6 illustrates a two-dimensional sub-band decorrelator.

FIG. 6 illustrates an example of a conventional decorrelator 12 for processing the image samples. The decorrelator comprises a horizontal filter stage 50, an intermediate field store 52, a transpose sequencer (address generator) 54, a vertical filter stage 56, an output field store 58 and an output sequencer 60. Sub-band filtering is effected on a separable basis. Thus, in FIG. 6, filtering in the two orthogonal image directions, namely the horizontal direction (the direction of image scanning in the case of conventional video) and the vertical direction, is effected entirely independently and separately of one another by respective one-dimensional filtering operations performed in the horizontal and vertical filter arrangements 50 and 56, respectively.

The horizontal filter arrangement 50 and vertical filter arrangement 56 can be of substantially the same construction as one another, that is a tree or hierarchical structure as shown on the left side of the dashed line 36 in FIG. 5, comprising three successive filter stages. There follows a brief description of the operation of the decorrelator 12.

In operation, the horizontal filter stage 50 processes the pixels of an input video field line-by-line and, within each line, pixel by pixel. Successive lines of data output by the eight outputs of third stage of the horizontal filter stage 50 are passed to the intermediate field store 52 and are stored at positions corresponding to respective one-eighths of those lines. This results in the intermediate field store 52 containing a version of the field of the input digital video signal that has been filtered into eight sub-bands in the horizontal direction (only). Each line of the field stored in the intermediate field store 52 is divided into eight portions each containing the horizontal spatial frequency information in a respective one of eight sub-bands of the horizontal spatial frequency range of the image that the original field represented. Thus, the horizontally filtered field stored in the intermediate field store 52 can be considered to be divided into eight columns.

The horizontally filtered field stored in the intermediate field store 52 is then fed (under the control of the transpose sequencer 54) into the vertical filter stage 56, in which it is filtered into eight sub-bands in the vertical direction in similar manner to that in which filtering into eight sub-bands in the horizontal direction was achieved in the horizontal filter stage 50. The horizontal and vertical filter stages have substantially the same construction as each other. However, as a result of the transposition effected by the transpose sequencer 54, the data are processed in a different order. The horizontally and vertically filtered field is fed on a line-by-line basis into the output field store 58. The store 58 can be considered to have been partitioned into an array of 64 (8×8) storage regions, in each of which a respective one of the 64 sub-bands is stored. The data relating to each of the sub-bands are referred to as a sub-picture, or sub-image. Thus, there are 64 sub-pictures or sub-images for each field of input video.

Figure 7:
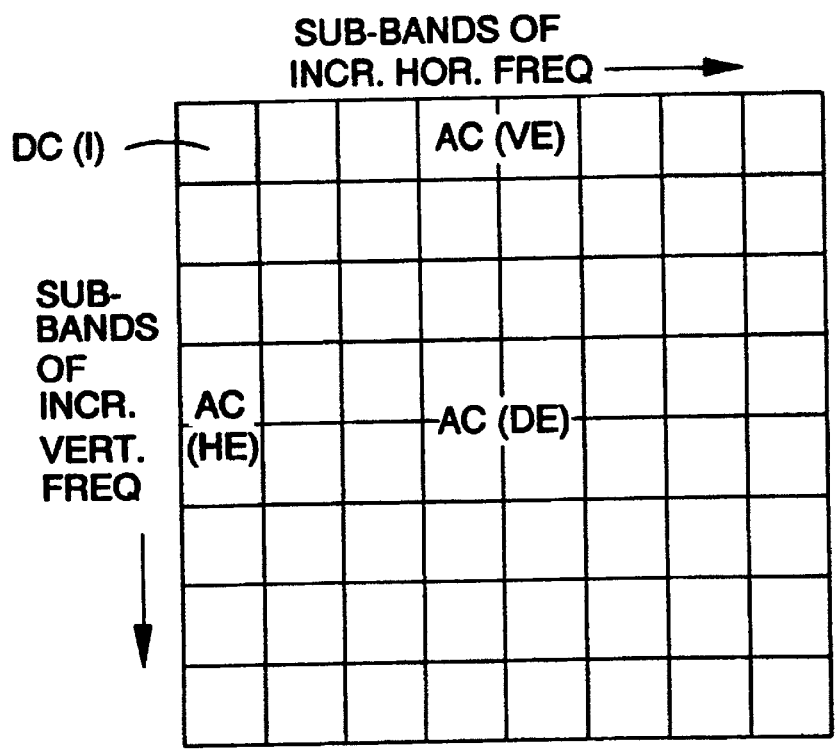
FIG. 7 illustrates a frequency separated video signal.

FIG. 7 represents the array of 64 sub-pictures for the respective sub-bands. The arrows to the top and the left of the array represent, respectively, the direction of increasing frequency content of the sub-bands as a result of the repeated decimation by the pairs of low and high frequency filters. In this example, "DC (I)" represents a DC sub-band which has the lowest horizontal and vertical frequency, which contains the majority of the DC luminance information of the original input video signal. The frequency which a particular one of the AC sub-bands represents increases in moving downwards and rightwards within the array of blocks. Sub-pictures AC(VE) contain frequencies with predominantly vertical edge data. Sub-pictures AC(HE) contain frequencies with predominantly horizontal edge data. Sub-pictures AC(DE) contain predominantly diagonal edge data.

The nature of the filtering produced by the combination of the horizontal and vertical filter stages 50 and 56 is such that data stored in the output field store 58 are somewhat scrambled as a result of the frequency inversion which takes place in each pair of low- and high-pass filters. The output sequencer 60 transposes the data (to compensate for the previous transposition performed by the transpose sequencer 54) and "de-scrambles" (i.e. re-orders) the data by selective addressing of the field store 58 before being passed for further processing. FIG. 8 illustrates an order of scanning of the sub-pictures which is suitable for the processing of component image signals. Thus the sub-pictures are accessed in the order 1, 2, 3, 4, and so on.

The data accessed by the output sequencer 60 are passed via the output 62 from the output field memory 58, in time multiplexed manner, to the quantiser 14. The sequencer also supplies signals at an output 64 to the quantiser 14 indicating the sub-picture or sub-band to which each sample currently output from the output field store 58 relates.

The quantisation operation performed by the quantiser 14 is a lossy operation in that it involves deliberate discarding of some frequency data considered to be redundant or of little importance to adequate perception of the image by the human psychovisual system and, in itself, enables some signal compression to be achieved. The quantiser 14 enables compression to be achieved in two ways: it reduces the number of levels to which the data input to it can be assigned, and it increases the probability of runs of zero value samples on the data it outputs. The ability to achieve enhanced signal compression provided by the operation of the quantiser is carried into effect in the entropy encoder 16 in that the reduction in information content achieved in the quantiser 14 enables a consequential bit (data) rate reduction to be achieved in the entropy encoder.

FIG. 9 shows a quantisation matrix that can be applied to the differing sub-pictures, or sub-bands, of FIG. 7 by the quantiser 14. The way in which the quantiser operates is that an overall value is assigned to the picture to be coded. For each sub-band, the overall value is divided by the corresponding matrix value to give a scaling value for all samples in that band. All operations are integer with rounding used in the divide operations.

It will be seen that the lowest quantisation values occur in the bands immediately below and to the right of the DC luminance sub-band. This is because the human visual system is most responsive to these sub-bands. The values for the quantisation matrix can be determined by a process of trial and error with subjective viewing tests to see which values give the best perceived image.

The quantisation matrix of FIG. 9 can be stored in a look-up table (not shown) in the quantiser 14. The individual quantisation value for a particular sub-picture is accessed by the quantiser using the sub-picture identifier for each sample output at 62 from the addressing logic 66 of the sequencer 14. Thus, the degree of quantisation applied to each sub-picture varies under control of the quantisation matrix. If desired, rather than a single quantisation matrix, the quantiser could include a plurality of different selectable quantisation matrices to optimise the degree of quantisation to the information content of an image.

The quantised samples are output from the quantiser 14 to the entropy encoder 16 as a 12 bit wide stream of two's complement encoded 12 bit sample words. Each sample word received by the entropy encoder is pre-coded, in a pre-coder 66. The pre-coder 66 reformats the incoming 12-bit, conventional two's complement encoded sample words using the following algorithm (where "x" is an incoming sample word):

IF x<0 THEN x=(x XOR 4095)*2+1;
ELSE x=x*2.

The effect of this pre-coding is to perform a barrel shift on the bits of non-negative words and to perform a barrel shift with the addition of one bit to the least significant bit (LSB) position for negative words. This is illustrated in Table 1, below, for words having the values −5 to +4.

TABLE 1

| VALUE | INPUT | OUTPUT |
| --- | --- | --- |
| 4 | 0100 | 1000 |
| 3 | 0011 | 0110 |
| 2 | 0010 | 0100 |
| 1 | 0001 | 0010 |
| 0 | 0000 | 0000 |
| -1 | 1111 | 0001 |
| -2 | 1110 | 0011 |
| -3 | 1101 | 0101 |
| -4 | 1100 | 0111 |
| -5 | 1011 | 1001 |

Figure 11:
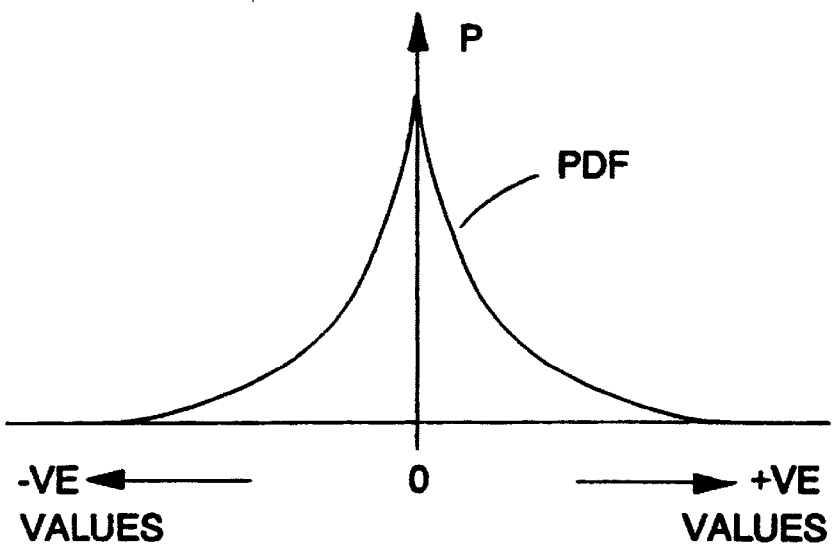
FIG. 11 is a graphical representation of a sample probability distribution function.

The sample words are pre-coded in this way because the entropy encoding employed works most efficiently if the most frequently changing bits are located in the lower significant bit positions within the words as will be explained later. As the probability distribution function PDF of the sample values is as represented in FIG. 11, that is centered around the value 0, the most frequently changing bit of all is the sign bit. Thus, although the most frequently changing data bits are located in the lower significant bit positions, in the case of two's complement encoded words, the most frequently changing bit of all is located in the most significant bit (MSB) position. The pre-coding in accordance with the algorithm above enables the sign bit to be moved to the lowest significant bit position. The pre-coder 66 for implementing the pre-coding algorithm mentioned above is preferably implemented by means of a programmable read only memory (PROM) which provides a mapping from the received two's complement codes into the reformatted codes. Alternatively, the pre-coder could be implemented by means of equivalent combinational circuitry or another means implementing a look-up table as will be apparent to one skilled in the art.

The stream of 12 bit words output from the pre-coder 66 is supplied to a most significant active bit (MSAB) detector 68 for detecting the bit position of the most significant active bit (i.e. the most significant non-zero bit) within a group of sample words.

A group of sample words is defined by a predetermined number of successive sample words. The number of sample words in a group will depend upon the particular application, and can be chosen to optimise the compression encoding for that application. Alternatively, a group of sample words can comprise a number of samples defined by a particular parameter of an application. For example, in the present embodiment, the number of samples in a group can be chosen to equal the number of samples in a sub-picture of decorrelated image samples.

The MSAB detector can be implemented by means of a register comprising one bit location for each bit position in the incoming sample words and control logic. The control logic includes means for initially resetting the bits of the register at the beginning of a group of words, then, for each non-zero bit of each incoming sample word, setting the corresponding bit in the register, and finally, at the end of group, identifying the most significant active bit position as being the most significant bit position within the register which is set.

The most significant active bit position for a group of samples is supplied from the MSAB detector 68 to an address generator 72 for reasons to be explained later. The sample words of that group of samples are stored in one of the memories 70A and 70B. Successive groups of sample words are stored alternately in either the memory 70A or in the memory 70B under the control of the address controller 72 while the other of the memories 70B and 70A is output under the control of the address controller 72. In this manner, data can be continuously processed by the entropy encoder with a delay corresponding to the number of sample words per group. The memories can be implemented in any appropriate memory technology which enables word-wise and bit-wise addressing of memory locations.

The 12 bits of a sample word are received in parallel from the circuit 68, and are stored in parallel in a word location within the appropriate memory 70A or 70B for the current group. Successively received words are stored in successive word locations within that memory 70A or 70B. Once a group of sample words has been stored in a memory 70A or 70B, the bits of that group of words are then read out in a bit stream in which successive bits are from a corresponding bit position of respective data words.

Figure 1:
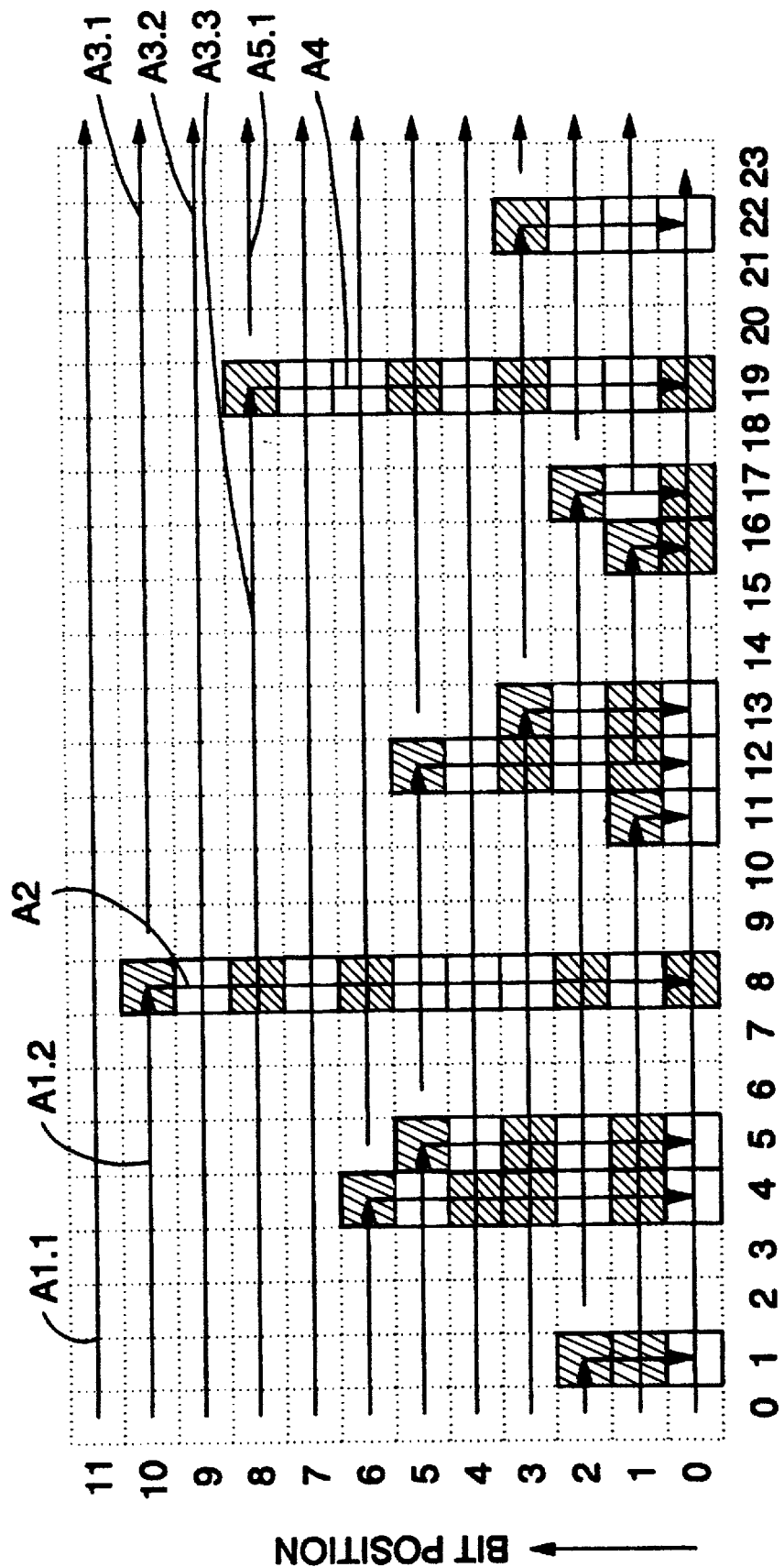
FIG. 1 is a schematic representation of the scanning of data samples in accordance with a prior data compression technique.
Figure 12:
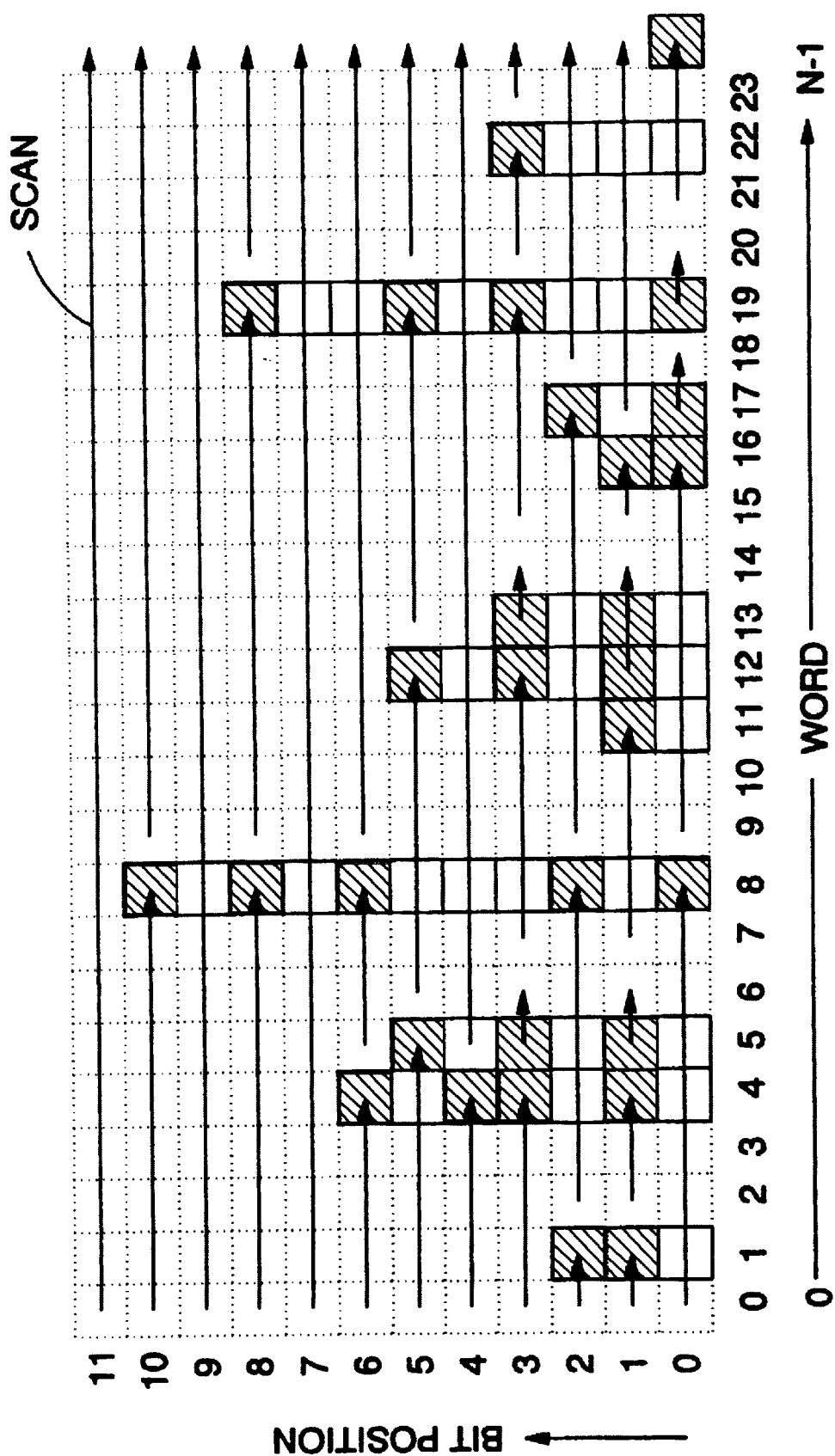
FIG. 12 is a schematic representation of the scanning of data samples in accordance with an example of the invention.

FIG. 12 represents one example of bit-wise scanning and run-length encoding of the sample words in accordance with the invention. In the two-dimensional array in FIG. 12, the horizontal direction represents successive sample words and the vertical axis represents the bits of each word from the least significant bit (LSB) position at the bottom (i.e. bit 0) to the most significant bit position (MSB) at the top (i.e. bit 11). As in FIG. 1, the cross-hatched bit positions represent non-zero bits and the blank bit positions represent zero bits. Words 0, 2, 3, 6, 7, 9, 10, 14, 15, 18, 20, 21 and 23 are assumed to represent words having only zero bits.

In the example shown in FIG. 12, all the bits of the group of sample words are output row-by-row and within each row, column-by-column from the top left hand bit (bit 11 of word 0) to the bottom right hand bit (bit 0 of word 23). Thus, the bits of a group of N M-bit sample words are output as a bit stream comprising a sequence of M sub-streams. Each sub-stream relates to a respective one of the M bit positions in the N data words and comprises a sequence of N data bits from that bit position of the N data words of the group.

The stream of bits for a group of sample words is output from the memory 70A or 70B to a bit sequence encoder 74. The bit sequence encoder counts first strings of bits of a first value terminated by a bit of a second value, subject to a first maximum string length, and counts second strings of the second value terminated by a bit of the first value, subject to a second maximum string length and encodes a bit string code for the first and second maximum string lengths and for each possible first string length and each possible second string length.

Figure 13:
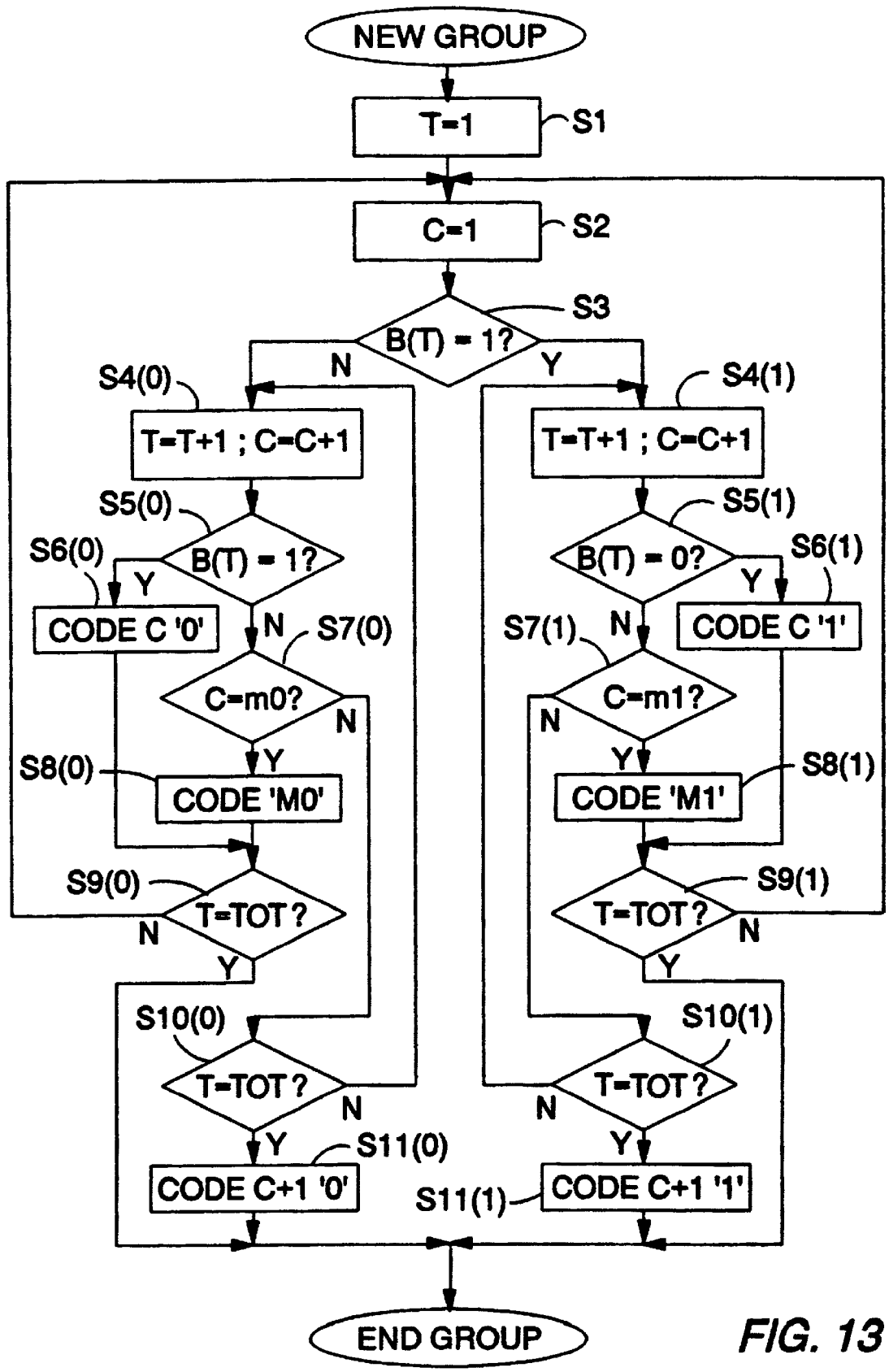
FIG. 13 is a flow diagram explaining the operation of a run length encoder.

FIG. 13 is a flow diagram for one example of the logical operations performed by a bit sequence encoder 74 of an embodiment of the invention.

When the data for a new group of sample words are to be output to the bit sequence encoder 74, this resets values of a total bit count T for the group of sample words and a bit run count C to 1 in steps S1 and S2, respectively.

In step S3, the value of the first bit B(T)=(B1) is tested. If bit 1 in the bit stream for the group of sample words is one, then control passed to step S4(1), otherwise control passes to step S4(0).

Assuming that bit (1) had the value 0, in step S4(0), the values of T and C are incremented. Then, in step S5(0), the next bit value is tested. If B(2)=1, then a minimum length '0' bit string of 2 (i.e. one 0 followed by a 1) is encoded in step S6(0). In subsequent passes through step S5(0), if a 1 is detected, then the appropriate length bit string is coded using the current value of C. If a 1 is not detected in step S5(0), then control passes to step S7(0) where the value of C is tested. If C equals the maximum bit string length for strings of zeros (i.e. m0), then in step S8(0), the maximum 0 bit stream length M0 is coded.

After step S6(0) or step S8(0), a test is made in step S9(0) to see whether all the bits which are to be output from the memory 70A or 70B for the group of sample words have been output. This test is made by comparing the value of T to a value TOT indicating the total number of bits to be output. If all the bits of the group are to be output, then TOT=M*N. However, as will be explained later, in some cases it may be desirable not to output all the bits of the sample words, in which case TOT will be some lower value. IF T=TOT, then the encoding of the stream of bits for the group of sample words is complete. If T<TOT, then there are still bits to be output and control returns to step S2 where the counter C is reset in order to encode the next run of bits. If in steps S5(0) and S7(0) it is determined that the current bit is 0 and the current C value is less than the maximum value zero run length m, then control passes to step S10(0) where the value of T is compared to the value TOT. If T=TOT, then no more bits are to be output for that group of sample words. However, if step S10(0) is reached, then there remains a string of zero bits which have not been encoded. Accordingly, the code for a string of zeros equal to the current count C following by a one (i.e. (C+1)'0') is encoded in step S11(0). As this terminates the group of sample words, there is no ambiguity in the use of this encoding. It is to be noted that another encoding for a termination string could be used if desired (e.g. a 'M0' encoding for a maximum length string). If T is found not to be equal to TOT is step S10(0), then control passes back to step S4(0) where the values of T and C are incremented and the next bit in the bit stream is analysed.

It can be seen in FIG. 13 that steps S4(1) to S11(1) mirror steps S4(0) to S11(0), respectively, which the values for 0 being replaced by those for 1 and vice versa. Accordingly, the explanation of these steps will not be repeated herein.

The logical steps illustrated in FIG. 13 can be implemented in any suitable manner, for example by means of a suitably programmed programmable logic array or an ASIC (Applications Specific Integrated Circuit).

The codes generated in steps S6(0),(1); S8(0),(1) and S11(0),(1) identify the count C or the maximum count length with the type of string (i.e. a string of zeros or a string of ones). The codes can be generated using registers or a small look-up table. In the case of the example shown in FIG. 12, the following string of run length codes would be generated ('0' represents a string of zeros followed by a one, 'M0' represents a string equal to the maximum zero string length (assumed to be 24 in the present example) and '1' represents a string of ones followed by a zero): 'M0'; 9 '0'; 'M0'; 24 '0'; 11 '0'; 'M0'; 9 '0'; 4 '0'; 21 '0'; 7 '0'; 7 '0'; 9 '0'; 24 '0'; 2 '1'; 6 '0'; 2 '1'; 5 '0'; 3 '0'; 3 '0'; 7 '0'; 9 '0'; 8 '0'; 3 '0'; 2 '1'; 5 '0'; 3 '1'; 2 '0'; 16 '0'; 8 '0'; 2 '1'; 2 '1'; 4 '0'.

It is assumed that none of the strings of ones exceeds the maximum encodable length ml for strings of ones. The example of 24 bits is chosen merely for reasons of explanation. The actual maxima for the lengths of zeros and ones will be application dependent and can be determined on a trial and error basis to optimise coding efficiency. The maximum coding length for string of zeros can be, but need not be chosen to be equal to the number of sample words in a block. The maximum encoding length for a string of ones will normally be, but need not be, shorter. Different maximum run lengths could be used for different sub-bands of a decorrelated image. Accordingly, possible maximum run lengths could be stored in a table and be selected using the sub-band identifier supplied at output 64 of the output sequencer 60. It has been found, however, that in a typical video image encoding application, for a group of 256 sample words, an effective maximum encodable length for strings of zeros is 256 bits and for strings of ones is 32. Table 2 below illustrates this encoding strategy.

TABLE 2

| ITEM | SEQUENCE | LENGTH | HUFFMAN CODE |
|---|---|---|---|
| 0 | 000 . . . 000 | 256 | xxxx |
| 1 | 01 | 2 | xx |
| 2 | 001 | 3 | xxx |
| 3 | 0001 | 4 | xxx |
| . . . | . . . | . . . | . . . |
| 255 | 000 . . . 01 | 256 | xxxxxxxxx |
| 256 | 111 . . . 1 | 32 | xxxxxx |
| 257 | 10 | 2 | xxx |
| 258 | 110 | 3 | xxxx |
| 259 | 1110 | 4 | xxxxx |
| . . . | . . . | . . . | . . . |
| 287 | 111 . . . 10 | 32 | xxxxxxxxxxxxx |

Table 2 also illustrates the application of a Huffman encoder to the encoded runs. The output of the bit sequence encoder 74 is supplied to a Huffman encoder in order to convert the run length codes into Huffman commaless codes. The coding is effected by using the run length codes to address one or more tables defining Huffman codes. The coding is most efficient when each run length and type is given a different Huffman code based on the statistics of typical data input. However, this would require a large Huffman encoding table.

Preferably, therefore, the run length codes are grouped together as illustrated in Table 3 below.

TABLE 3

| Pattern | Length | Huffman Code |
|---------|--------|--------------|
| 0 | 256 | xxxxxxxxx |
| 1 | 2 | xxxxxxxxx |
| 2 | 3 | xxxx0 |
| 3 | 4 | xxxx1 |
| 4 | 5 | xxxx00 |
| 5 | 6 | xxxx01 |
| 6 | 7 | xxxx10 |
| 7 | 8 | xxxx11 |
| 8 | 9 | xxxx000 |
| 9 | 10 | xxxx001 |
| 10 | 11 | xxxx010 |
| 11 | 12 | xxxx011 |
| 12 | 13 | xxxx100 |
| 13 | 14 | xxxx101 |
| 14 | 15 | xxxx110 |
| 15 | 16 | xxxx111 |

Thus, the Huffman coding is achieved by grouping the run patterns of Table 2 with one Huffman code being allocated to each group, the Huffman code being supplemented by a binary code such that each individual pattern is uniquely identified. It will be appreciated that Table 3 only illustrates the first 16 coding patterns, and that the approach can be extrapolated for further values. Also, it will be appreciated that the strings of 'x's do not represent a specific Huffman code length. The actual Huffman codes to be applied will depend upon the particular application. A description of how Huffman codes can be allocated to appropriate events is given in the book entitled "Coding and Information Theory" by R W Hamming in Chapter 4, pages 64 to 68 (ISBN 0-13-139139-9).

The grouping of the coding as illustrated in Table 3 only has a relatively minor impact on the overall encoding efficiency. However, it does mean that much smaller Huffman coding tables are required with a resulting reduction in hardware cost. In particular, rather than requiring a table with 288 Huffman codes, there are now only 9+6=15 basic Huffman codes for a Huffman coding table. The Huffman codes are used as a pointer to the base of its respective group of codes, with the binary code acting as an offset to that pointer.

Different Huffman encoding tables could be employed for different sub-pictures or sets of sub-pictures of a decorrelated image. The Huffman encoding tables could be selected using the sub-picture (or sub-picture set) identifier supplied at output 64 of the output sequencer 60. In an alternative embodiment of the invention referred to below, where a separate bit sequence encoder is employed for each bit position in the M bit words, different Huffman codes could be employed for each of the separate bit streams produced by the respective bit sequence encoders, and each bit sequence encoder operates in a manner as shown in FIG. 13.

FIG. 12 illustrates the output of all the bits of the group of words. However, this is not always necessary. As a result of the pre-coding by the pre-coder 66, the most frequently changing bits are located in the lower significant bit positions within the sample words. Accordingly, it can often happen that the most significant bit positions do not contain any active bits. The MSAB detector 68 identifies the most significant active bit within a group of sample words, and supplies the identity of the most significant active bit position to the address generator 72. Using this information, the address generator can cause the scanning of the bits of the group of words to start at the bit position in the group of words at which the most significant active bit is located, the need to scan all the bits thus being avoided. Thus, in FIG. 12, for example, the scanning could have started at bit position 10 in word 0, rather than in bit position 11 in word in 0.

The address generator 72 supplies the bit position at which the scanning is started for a group of words to a header inserter 78. The header inserter 78 then inserts a header at the beginning of a group of entropy encoded words identifying the bit position at which scanning started in order that this information is available when the compressed data are subsequently recovered. Where twelve bit sample words are encoded as in the present example, four bits only are needed to encode the scan starting position.

Figure 10:
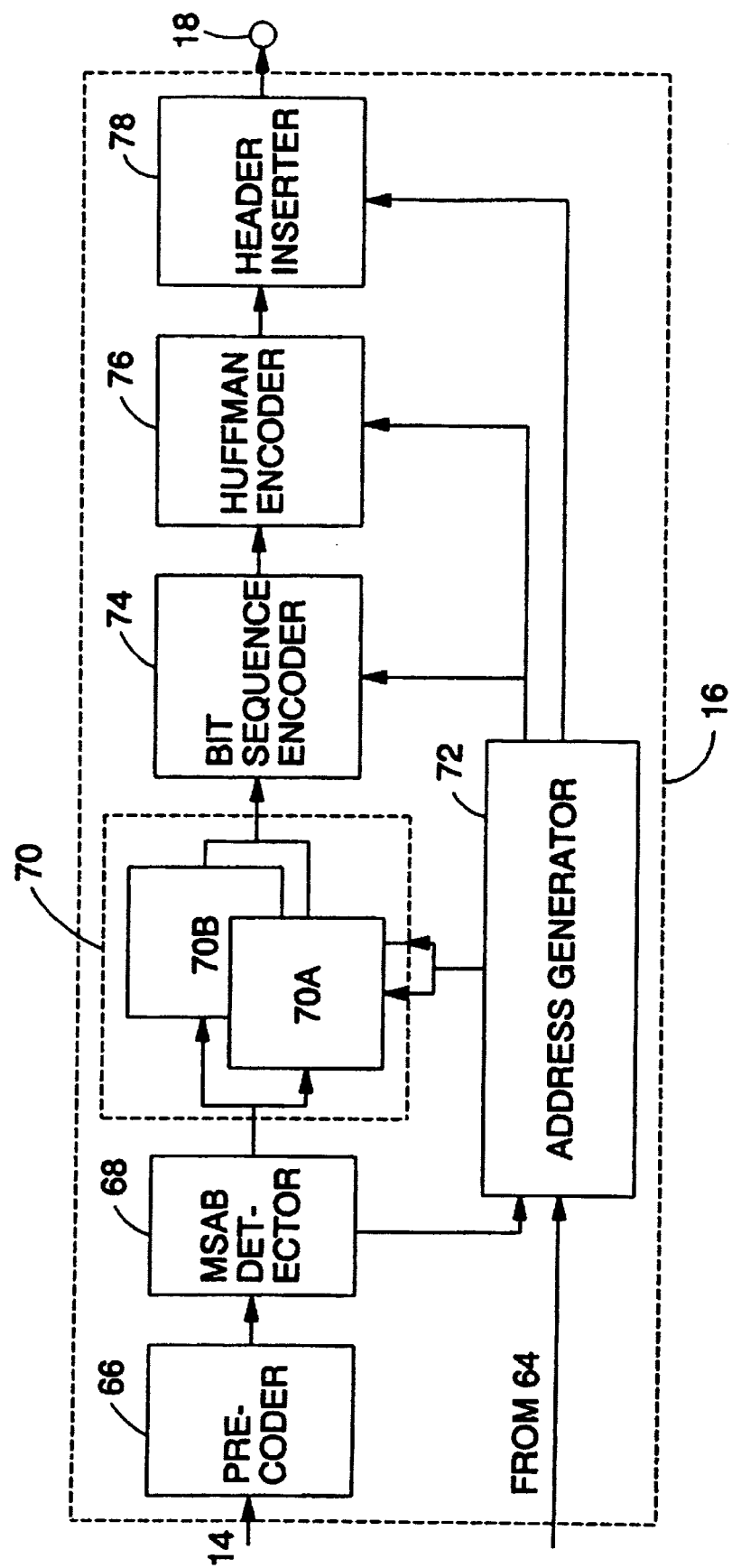
FIG. 10 is a schematic block diagram of an example of an entropy encoder in accordance with the invention.
Figure 10A:
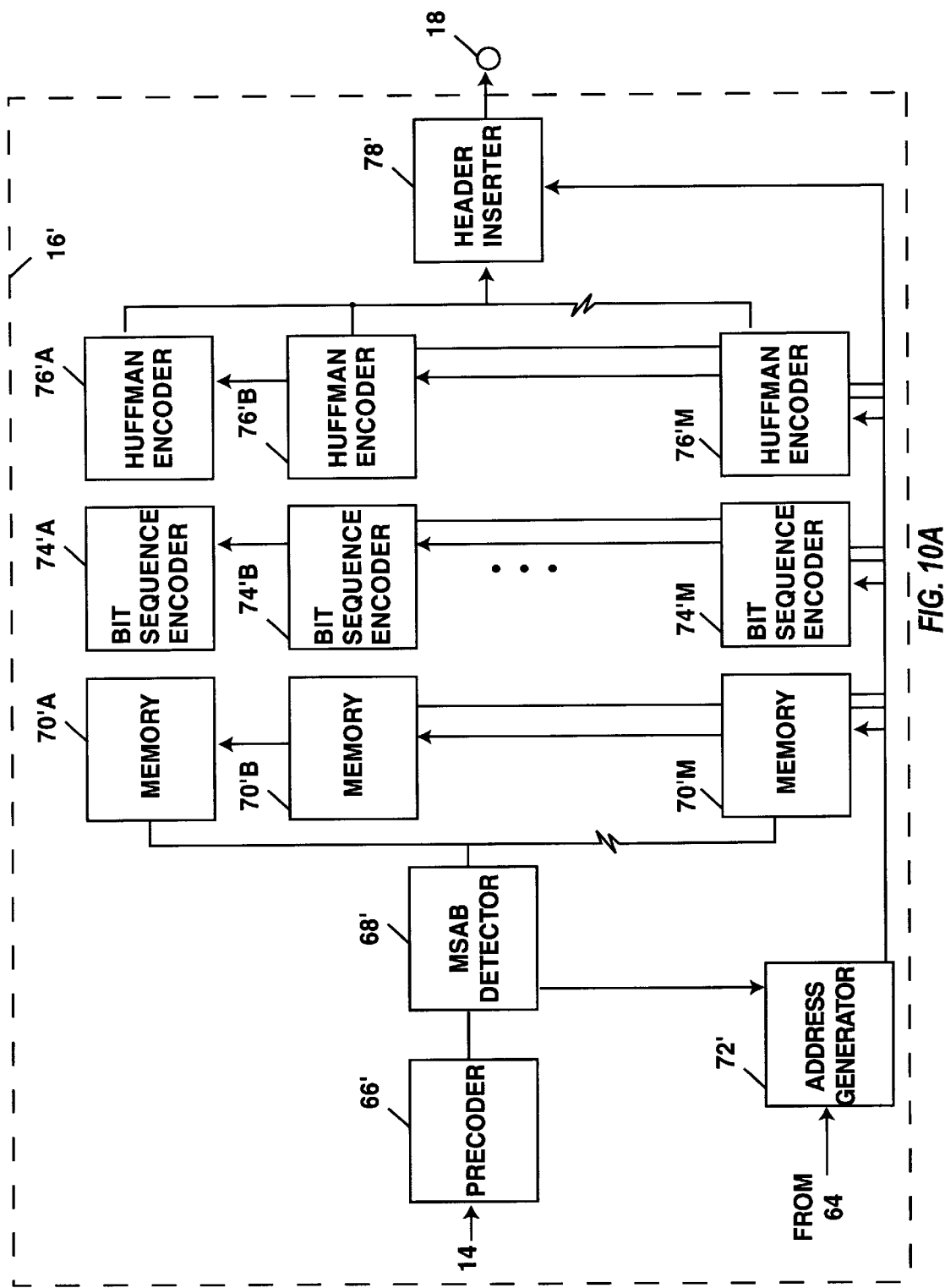

Thus the entropy encoder as illustrated in FIG. 10 enables bit coding to be effected on a continuous string of bits scanned as per reading a text, that is from left to right, top to bottom. The number of bits coded is the length of the group plus the number of bits included in a header code. The string coding is performed by measuring the number of bits with a run of 0's followed by a 1 or a run of 1's followed by a 0. The length of each sequence is coded as the type (00..01 or 11..10) with a maximum length for each type being set (e.g. 256 for 00..01 and 32 for 11..10). Two further codes are added, one for a string of zeros at the maximum length and one for a string of ones at the maximum length. Each code length and type is given a Huffman commaless code and this code is transmitted or recorded in place of the run pattern. The addition of the two extra codes for continuous runs allows very long runs of either 1's or 0's to be coded efficiently. Either value can be changed to reflect the circumstances of the data to be coded. The minimum run length in all cases is two, a 01 or a 10 sequence being the shortest run possible.

The bit sequence encoder 74 performs a run-length encoding of all the bits of the group of words output from the memory 70A or 70B. This contrasts with the skip coding approach of the Delogne and Macq article mentioned in the introduction to the description where strings of zeros are run-length encoded but the non-zero words are output uncoded.

Figure 14:
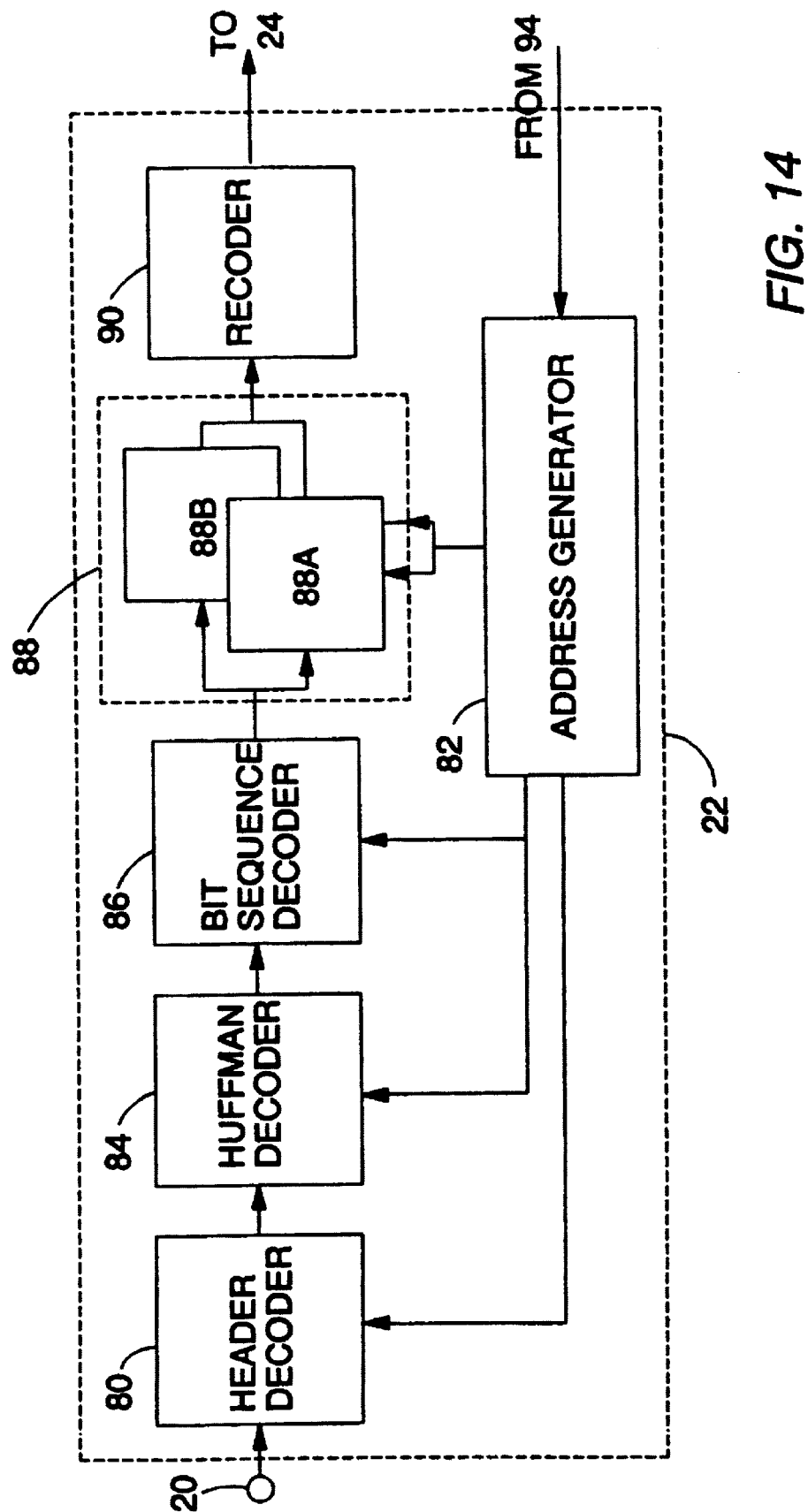
FIG. 14 is a schematic block diagram of an entropy decoder complementary to the entropy encoder of FIG. 10.

FIG. 14 illustrates a complementary entropy decoder 22 for use in the decompressing apparatus of FIG. 2 for decompressing data compressed by the entropy encoder of FIG. 10.

The compressed data, which are received at input 20 of the entropy decoder, are supplied to a header decoder 80 for reading the header information identifying the scan starting position used for a group of sample words during encoding. The header information is supplied to the address generator 82, with the compressed data being supplied to a Huffman decoder 84. The Huffman decoder 84 comprises Huffman tables complementary to those in the Huffman encoder 76 for generating bit sequence data for the received Huffman codes. The bit sequence codes are used by the bit sequence decoder 86 to generate bit sequences which are supplied to the memories 88A and 88B for storage under the control of the address generator 82 using the scan starting position information. The data are stored serially in bits in the memories 88 and are subsequently read from those memories in parallel by sample words in a manner complementary to the addressing of the memories 70A and 70B of the entropy encoder 16. The data read from the memories 88 are recoded in a recorder 90 complementary to the pre-coder 66 to regenerate the two's complement encoded sample words for supply to the dequantiser 24. The dequantiser 24 comprises dequantisation tables complementary to those of the quantiser 14.

Figure 15:
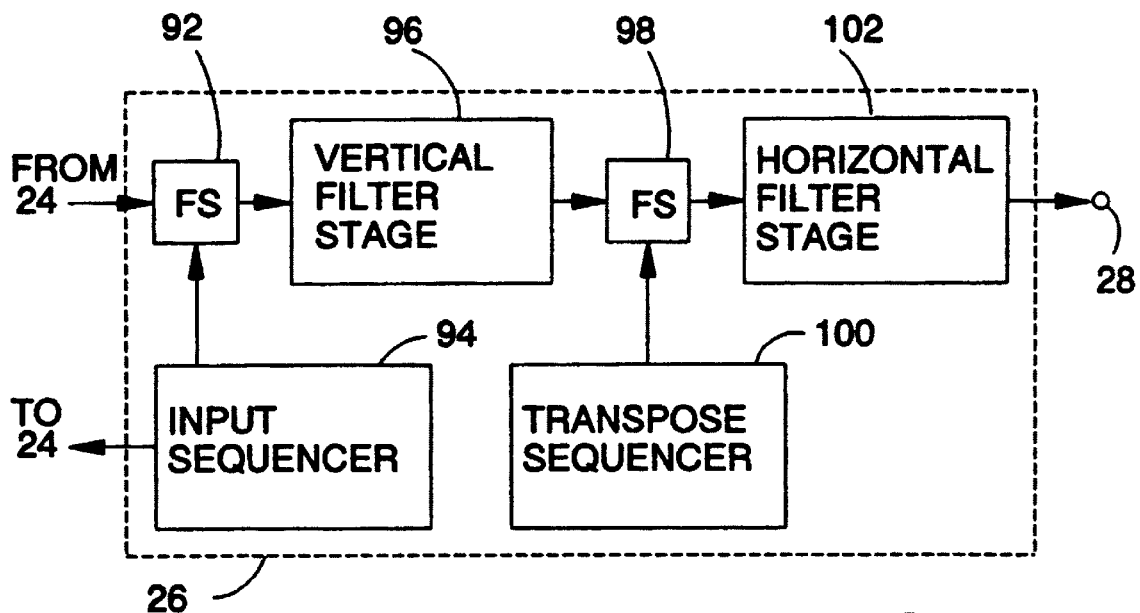
FIG. 15 is a schematic illustration of a two-dimensional sub-band interpolator.

FIG. 15 illustrates an example of an interpolator 26 complementary to the decorrelator 12. The interpolator 26 mirrors the decorrelator 12 in structure and in operation, with a first field store 92, an input sequencer 94, a vertical filter stage 94, an intermediate field store 98, a transpose sequencer 100 and a horizontal filter stage 102. Each of the vertical and horizontal filter stages can be implemented as the tree structure to the right of the dashed line 36 in FIG. 4. The restored decompressed and interpolated video image is output at 28.

There has been described an example of compression and decompression apparatus which enables more effective compression of data.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

In the described embodiment, the bit coding is effected on a continuous string of bits scanned as per reading a text, that is from left to right, top to bottom. However, it will be appreciated that other scanning patterns could be employed, such as a zig-zag scanning pattern. The number of bits encoded is the length of the group plus the number of bits included in a header code. The header code can include information about a scan starting position and details of the encoding of the sample words, for example to identify the number of active bits and/or the location of a perfectly encoded bit.

In the described embodiment, string coding is performed by measuring the number of bits with a run of 0's followed by a 1 or a run of 1's followed by a 0. The length of each sequence is coded as the type (00..01 or 11..10) with a maximum length for each type being set (e.g. 256 for 00..01 and 32 for 11..10). The maximum run lengths can be chosen in dependence upon the particular application. Also, it will be appreciated that another set of codes could be chosen as required by the application.

In the described embodiment, a termination code is provided where the final bit of the bit stream for a group of words is not perfectly encoded. However, as an alternative, the bit streams for successive groups of sample words could be concatenated and the encoding carried over from one group to the next.

In the described embodiment each code length and type is given a Huffman commaless code and this code is transmitted or recorded in place of the run pattern. However, other commaless codes could be employed.

In the described embodiment one bit sequence encoder receives a single bit stream from the memories 70A or 70B. It will be appreciated however, that as an alternative, two or more bit stream encoders could be provided in parallel, each receiving data from a sub-set of the bit positions of the sample words.

Indeed, in an alternative embodiment of the invention, one bit stream encoder can be provided for each bit position within the words. Thus, for M-bit sample words, M bit stream encoders are provided, each encoding a bit stream for a respective bit position. The M bit stream encoders encode the bits of successive words in parallel.

Such an implementation is particularly suitable for use in, for example, a digital video tape recorder system where compressed data is recorded in blocks having a fixed maximum size. In order to avoid data overflow in the blocks of compressed data, a test can be made on the encoding of each sample word to establish whether the block has overflowed. If so, then the block can be terminated at the encoding for the previous sample word. In such a case, it would be necessary to employ a termination string as described with respect to step 11(0) of FIG. 13 for each bit string which was not perfectly encoded at the terminal sample word.

A header is preferably provided for each compressed block of data. The header for the block preferably comprises a first code identifying the MSAB determined by the MSAB detector 68 and a second code indicating a bit position in the terminal sample word for which a bit string is perfectly encoded. The first code enables the compression encoding of only bit positions at which active bits are to be found. The second code enables the terminal sample word for the block to be identified by a subsequent decoder. If no sample word is perfectly encoded then an invalid bit position value should be encoded (e.g. 12) as the second code. Thus, for example with reference to FIG. 12, if the terminal word encoded is word 22, then bit position 3 will be perfectly encoded so that bit position 3 would be identified in the header. At word 13, however, no bit position is perfectly encoded so that a value of 12 would be identified in the header. For 12 bit sample words, an eight bit header is sufficient, the header having four bits for identifying the MSAB and four bits for identifying the location of a perfectly encoded bit stream at a terminal word.

If the invention is intended to be used in an application where a storage medium is used for the compressed data which is susceptible to error, error correction techniques could be employed. For example, the header inserter of a compression processing apparatus could be employed in a known manner to add error correction data to blocks of compressed data for storage. The header reader of a corresponding decompression processing apparatus could be employed in a known manner to attempt error correction on the basis of the stored error correction information. Known techniques for the concealment of errors could also be employed.

Also, although the invention has been described with reference to the processing of component video images, the invention is also applicable to image processing systems which process image data in composite form.

Indeed, although the invention has been specifically described in the context of apparatus for compressing and decompressing image data, it will be appreciated that the invention is also applicable to the compression and decompression of other types of data.

What is claimed is:

1. A data compression system for compressing M-bit data words, where M is a plural positive integer, comprising:
   group defining means for defining a group of N data words, where N is a plural positive integer;
   sequencing means for outputting bits of said group of N data words as a set of bit streams, each bit stream corresponding to a bit position in said M-bit data word and including a sequence of N data bits from the bit position of the respective N data words; and
   run length encoding means connected to said sequencing means, comprising
      string counter means for counting first strings of bits of a first value terminated by a bit of a second value, subject to a first maximum string length, and for counting second strings of the second value terminated by a bit of the first value, subject to a second maximum string length, in said bit stream, and string encoding means for encoding a bit string code for said first and second maximum string lengths and for each possible first string length and each possible second string length, whereby said run length encoding means outputs a series of bit string codes for the bit streams of the group of N data words.

2. A data compression system according to claim 1, wherein said sequencing means comprises
  means for identifying the bit position of a most significant active bit in the group of N data words;
  header generating means for generating a header for the group of N data words indicative of the bit position of the most significant active bit; and
  means for outputting only those bits at the bit positions equal to or less significant than the most significant active bit of the group of N data words.

3. A data compression system according to claim 1, wherein said sequencing means outputs bits for the group of N data words in the same order for each bit position.

4. A data compression system according to claim 1, wherein
  said group defining means comprises a first memory means for storing the group of N data words, and
  said sequencing means comprises address generating means for addressing individual bits of the group of N data words stored in the first memory means for outputting the set of bit streams.

5. A data compression system according to claim 4, wherein
  said group defining means further comprises a second memory means for storing another group of N data words, and
  said sequencing means further comprises means for alternating between addressing the first memory means for outputting a bit stream for a previously stored group of N data words while a subsequent group of N data words are stored in the second memory means and addressing the second memory means for outputting a previously stored group of N data words while a subsequent group of N data words are stored in the first memory means.

6. A data compression system according to claim 5, wherein said sequencing means outputs bit streams for multiple groups of N data words concatenated one to another.

7. A data compression system according to claim 1, wherein said sequencing means serially outputs bit streams for the respective bit positions concatenated one to another.

8. A data compression system according to claim 7, wherein said sequencing means outputs bits of the group of N data words in order of decreasing bit significance.

9. A data compression system according to claim 1, wherein
  multiple sequencing means are arranged in parallel for outputting plural bit streams, each of the bit streams corresponds to at least one of said M-bit positions in the group of N data words and includes a sequence of data bits from the bit position of the respective N data words, and
  a plurality of run length encoders are connected to said multiple sequencing means to receive and encode a respective one of the plural bit streams.

10. A data compression system according to claim 9, comprising M parallel sequencing means, each outputting a bit stream corresponding to a respective bit position in the group of N data words.

11. A data compression system according to claim 10, further comprising means for creating blocks of compressed data of a fixed maximum size, and wherein said sequencing means comprises
  means for terminating encoding the groups of N data words to avoid overflowing the compressed data block at a terminal data word, and
  means for generating a header indicative of a perfectly encoded bit position for that terminal data word.

12. A data compression system according to claim 1, wherein said run length encoding means further comprises
  group counter means for counting a total number of bits in the set of bit streams for the group of N data words output by said sequencing means and
  group terminator means responsive to said group counter means and to an end bit stream, for which no specific encoding is defined when a last bit for the group of N data words is output by said sequencing means, for terminating encoding the end bit stream by using a predetermined run length code selected from those for the first and second maximum string lengths and the possible first and second string lengths.

13. A data compression system according to claim 1, further comprising commaless encoding means connected to said run length encoding means for commaless encoding the run length codes.

14. A data compression system according to claim 13, wherein said commaless encoding means comprises Huffman look-up tables in which possible run length code entries are grouped in accordance with a probability of occurrence.

15. A data compression system according to claim 1, further comprising data preprocessing means for mapping input data values of the group of N data words in accordance with a predetermined mapping.

16. A data compression system according to claim 15, wherein said data preprocessing means maps the input data values so that frequently changing bits in the group of N data words are placed in less significant bit positions.

17. A method for compressing M-bit data words, where M is a plural positive integer, comprising the steps of:
  defining a group of N data words, where N is a plural positive integer;
  outputting bits of the group of N data words as a set of bit streams in which each bit stream corresponds to a respective one of the bit positions in the M-bit data word and includes a sequence of N data bits from the bit position of the respective N data words; and
  run length encoding the bit streams received from said step of outputting, comprising the steps of
    counting first strings of bits of a first value terminated by a bit of a second value, subject to a first maximum string length, and counting second strings of the second value terminated by a bit of the first value, subject to a second maximum string length, in said bit stream; and
    encoding a bit string code for said first and second maximum string lengths and for each possible first string length and second string length, whereby a series of bit string codes for the bit streams are generated.

18. A method according to claim 17, wherein said step of outputting comprises the steps of:
  identifying a bit position of a most significant active bit in the group of N data words;
  generating a header for the group of N data words indicative of the bit position of the most significant active bit; and outputting only those bits in the bit positions equal to or less significant than the bit position of the most significant active bit of the group of N data words.

19. A method according to claim 18, wherein said step of outputting outputs the bits of the group of N data words in the same order for each bit position.

20. A method according to claim 17, wherein
said step of defining comprises storing the N data words in a first memory, and
said step of outputting comprises generating addresses for individual bits of the stored N data words for outputting the set of bit streams.

21. A method according to claim 20, wherein
said step for defining further comprises storing another group of N data words in a second memory, and
said step of outputting further comprises alternating between addressing the first memory for outputting a bit stream for a previously stored group of N data words while a subsequent group of N data words are stored in the second memory and addressing the second memory for outputting a previously stored group of N data words while a subsequent group of N data words are stored in the first memory.

22. A method according to claim 21, wherein said step of outputting concatenates bit streams from multiple groups of N data words one to another.

23. A method according to claim 17, wherein said step of outputting comprises serially concatenating bit streams of the respective bit positions one to another.

24. A method according to claim 23, wherein said step of outputting outputs the bits of the group of said bits of N data words in order of decreasing bit significance.

25. A method according to claim 17, wherein
said step of outputting comprises outputting plural bit streams in parallel, each of the bit streams corresponds to at least one of said M-bit positions in the group of N data words and includes a sequence of data bits from the bit position of the respective N data words, and
said step of run length encoding comprises run length encoding each of the plural bit streams in parallel.

26. A method according to claim 25, wherein said step of outputting outputs M parallel bit streams, each corresponding to a respective bit Position in the group of N data words.

27. A method according to claim 26, wherein
said step of defining comprises generating blocks of compressed data of a fixed maximum size are generated,
said step of run length encoding further comprises terminating encoding the group of N data words to avoid overflowing the compressed data block at a terminal data word, and
said step of outputting further comprises creating a header indicative of perfectly encoded bit position for that terminal data word.

28. A method according to claim 17, wherein
said step of counting comprises counting a total number of bits in said bit stream for the group of N data words output in said step of outputting; and
said step of encoding comprises terminating encoding an end bit stream for which no specific encoding is defined when a last bit for the group of N data words is output in said step of outputting by using a predetermined run length code selected from the first and second maximum string lengths and the possible first and second string lengths.

29. A method according to claim 17, wherein said step of run length encoding comprises the step of commaless encoding said run length codes.

30. A method according to claim 29, wherein said step of commaless encoding comprises deriving the commaless code from Huffman look-up tables in which possible run length codes are grouped in accordance with a probability of occurrence.

31. A method according to claim 17, wherein said method further comprises the step of preprocessing data words by mapping input data values of the group of N data words in accordance with a predetermined mapping.

32. A method according to claim 31, wherein said step of preprocessing data maps the input data values so that frequently changing bits in the group of N data words are placed in less significant bit positions.

33. A data compression system for compressing M-bit data words, where M is a plural positive integer, comprising:
data preprocessing means for mapping input data values so that frequently changing bits in the group of N data words are placed in less significant bit positions;
group defining means for defining a group of N data words, where N is a plural positive integer;
means for identifying a bit position in said M-bit data word of a most significant active bit in the group of N data words;
means for generating a header for the group of N data words indicative of the bit position of the most significant active bit;
sequencing means for outputting only those bits in the bit position equal to or lesser than the bit position of the most significant active bit of the group of N data words as a set of bit streams, each bit stream corresponding to a respective bit position in said M-bit data word and including a sequence of N data bits from the bit position of the respective N data words; and
run length encoding means connected to said sequencing means, comprising
string counter means for counting first strings of bits of a first value terminated by a bit of a second value, subject to a first maximum string length, and for counting second strings of the second value terminated by a bit of the first value, subject to a second maximum string length, in said bit stream, and string encoding means for encoding a bit string code for said first and second maximum string lengths and for each possible first string length and each possible second string length, whereby said run length encoding means outputs a series of bit string codes for the bit streams of the group of N data words.

34. A data compression system according to claim 33, wherein said run length encoding means further comprises:
group counter means for counting a total number of bits in the set of bit streams for the group of N data words output by said sequencing means and
group terminator means responsive to said group counter means and to an end bit stream, for which no specific encoding is defined when a last bit for the group of N data words is output by said sequencing means for terminating encoding the end bit stream by using a predetermined run length code selected from those for the first and second maximum string lengths and the possible first and second string lengths.

35. A data compression system according to claim 33, wherein
said group defining means comprises a first memory means for storing the group of N data words, and said sequencing means comprises address generating means for addressing individual bits of the group of N data words stored in the first memory means for outputting the set of bit streams.

36. A data compression system according to claim 35, wherein
said group defining means further comprises a second memory means for storing another group of N data words, and
said sequencing means further comprises means for alternating between addressing the first memory means for outputting a bit stream for a previously stored group of N data words while a subsequent group of N data words are stored in the second memory means and addressing the second memory means for outputting a previously stored group of N data words while a subsequent group of N data words are stored in the first memory means.

37. A data compression system according to claim 33, wherein said sequencing means serially outputs bit streams for the respective bit positions of the groups of N data words concatenated one to another.

38. A data compression system according to claim 37, wherein said sequencing means outputs bits of the group of N data words in order of decreasing bit significance.

39. A method for compressing M-bit data words, where M is a plural positive integer, comprising the steps of:
preprocessing data words by mapping input data values so that frequently changing bits in the group of N data words are placed in less significant bit positions;
defining a group of N data words, where N is a plural positive integer;
identifying a bit position in the M-bit data word of a most significant active bit in the group of N data words;
generating a header for the group of N data words indicative of the bit position of the most significant active bit;
outputting only those bits in the bit position equal to or lesser than the bit position of the most significant active bit are output of the group of N data words as a set of bit streams in which each bit stream corresponds to a respective bit position in the M-bit data word and includes a sequence of N data bits from the bit position of the respective N data words; and
run length encoding the bit streams output received from said step of outputting, comprising the steps of
counting first strings of bits of a first value terminated by a bit of a second value, subject to a first maximum string length, and counting second strings of the second value terminated by a bit of the first value, subject to a second maximum string length, in said bit stream, and
encoding a bit string code for said first and second maximum string lengths and for each possible first string length and each possible second string length to output a series of bit string codes for the bit streams of the group of N data words.

40. A method according to claim 39, wherein said step of run length encoding further comprises the steps of
said step of counting comprises counting a total number of bits in the set of bit streams for the group of N data words output in said step of outputting, and
said step of terminating encoding responsive to said group counter means and to an end bit stream for which no specific encoding is defined when a last bit for the group of N data words is output in said step of outputting by using a predetermined run length code selected from those for the first and second maximum string lengths and the possible first and second string lengths.

41. A data compression system according to claim 39, wherein
said step of defining comprises storing the group of N data words in a first memory, and
said step of outputting comprises generating addresses for individual bits of the group of N data words stored in the first memory for outputting the set of bit streams.

42. A data compression system according to claim 41, wherein
said step of defining further comprises storing another group of N data words in a second memory, and
said step of outputting further comprises alternating between addressing the first memory for outputting a bit stream for a previously stored group of N data words while a subsequent group of N data words are stored in the second memory and addressing the second memory for outputting a previously stored group of N data words while a subsequent group of N data words are stored in the first memory.

43. A method according to claim 39, wherein said step of outputting serially outputs bit streams for the respective bit positions of the group of N data words concatenated one to another.

44. A method according to claim 43, wherein said step of outputting outputs the bits of the group of N data words in order of decreasing bit significance.

* * * * *